(12) United States Patent
Lisuk et al.

(10) Patent No.: US 12,353,477 B2
(45) Date of Patent: **\*Jul. 8, 2025**

(54) PROVIDING AN OBJECT-BASED RESPONSE TO A NATURAL LANGUAGE QUERY

(71) Applicant: Palantir Technologies Inc., Denver, CO (US)

(72) Inventors: David Lisuk, New York, NY (US); Eric Porter, Pepper Pike, OH (US); Aditya Shashi, Seattle, WA (US); Ilai Soloducho, Tel Aviv (IL); John Wiseheart, London (GB); Guodong Xu, Issaquah, WA (US); Maciej Foks, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,111

(22) Filed: May 23, 2024

(65) Prior Publication Data

US 2024/0386060 A1 Nov. 21, 2024

Related U.S. Application Data

(60) Continuation of application No. 17/550,921, filed on Dec. 14, 2021, now Pat. No. 12,008,047, which is a
(Continued)

(51) Int. Cl.
*G06F 16/903* (2019.01)
*G06F 16/2457* (2019.01)
(Continued)

(52) U.S. Cl.
CPC ............... *G06F 16/90344* (2019.01); *G06F 16/24578* (2019.01); *G06F 16/90332* (2019.01);
(Continued)

(58) Field of Classification Search
CPC ......... G06F 16/90344; G06F 16/24578; G06F 16/90332; G06F 16/9038; G06F 40/205;
(Continued)

(56) References Cited

U.S. PATENT DOCUMENTS 7,149,983 B1  12/2006  Robertson et al.
7,672,833 B2   3/2010  Blume et al.
(Continued)

FOREIGN PATENT DOCUMENTS

EP    3399443 A1    11/2018
WO  2014138185 A1    9/2014

OTHER PUBLICATIONS

Extended European Search Report for EP Application No. 18170321, mailed Jun. 12, 2018, 7 pages.

*Primary Examiner* — Jorge A Casanova
(74) *Attorney, Agent, or Firm* — Faegre Drinker Biddle & Reath LLP—Palantir

(57) ABSTRACT

A data analysis system presents a user interface to allow a user to provide a natural language query pertaining to a dataset, wherein the dataset is associated with a data object model comprising a plurality of objects and receives, via the user interface, user input specifying the natural language query. The data analysis system further modifies, in the user interface, the user input to visually indicate one or more portions of the natural language query that each represent one of the plurality of objects and presents, in the user interface, a response to the natural language query, the response being based on data from the dataset, the data corresponding to the one of the plurality of objects.

18 Claims, 7 Drawing Sheets

Related U.S. Application Data division of application No. 16/249,774, filed on Jan. 16, 2019, now Pat. No. 11,238,102.

(60) Provisional application No. 62/777,604, filed on Dec. 10, 2018.

(51) Int. Cl.
- *G06F 16/9032* (2019.01)
- *G06F 16/9038* (2019.01)
- *G06F 40/205* (2020.01)
- *G06F 40/40* (2020.01)
- *G06N 20/00* (2019.01)

(52) U.S. Cl.
CPC ........ *G06F 16/9038* (2019.01); *G06F 40/205* (2020.01); *G06F 40/40* (2020.01); *G06N 20/00* (2019.01)

(58) Field of Classification Search
CPC ...... G06F 40/40; G06F 16/243; G06F 40/237; G06F 40/279; G06N 20/00; G06N 3/045; G06N 5/022
See application file for complete search history.

(56) References Cited

U.S. PATENT DOCUMENTS

| | | |
|---|---|---|
| 7,996,210 B2 | 8/2011 | Godbole et al. |
| 8,515,739 B2 | 8/2013 | Godbole et al. |
| 8,566,327 B2 | 10/2013 | Carrico et al. |
| 9,552,615 B2 | 1/2017 | Mathura et al. |
| 10,198,511 B1 | 2/2019 | Gupta et al. |
| 10,235,461 B2 | 3/2019 | Elkherj et al. |
| 2008/0228720 A1 | 9/2008 | Mukherjee et al. |
| 2014/0280314 A1 | 9/2014 | Coleman et al. |
| 2016/0048937 A1 | 2/2016 | Mathura et al. |
| 2016/0171113 A1 | 6/2016 | Fanous et al. |
| 2016/0239490 A1 | 8/2016 | Dhamdhere et al. |
| 2017/0111059 A1 | 4/2017 | Guilford et al. |
| 2017/0221063 A1 | 8/2017 | Mathura et al. |
| 2018/0293387 A1 | 10/2018 | Bar-El et al. |
| 2018/0322198 A1 | 11/2018 | Elkherj et al. |
| 2018/0349474 A1 | 12/2018 | Smith et al. |
| 2019/0147083 A1 | 5/2019 | Milligan et al. |
| 2019/0272296 A1 | 9/2019 | Prakash et al. |
| 2019/0318009 A1 | 10/2019 | Miller et al. |
| 2022/0179665 A1 | 6/2022 | Rathod |
| 2022/0391428 A1 | 12/2022 | Faruqui et al. |

PROVIDING AN OBJECT-BASED RESPONSE TO A NATURAL LANGUAGE QUERY

RELATED APPLICATIONS

This application is a continuation of U.S. application Ser. No. 17/550,921, filed Dec. 14, 2021, which is a divisional application of U.S. patent application Ser. No. 16/249,774, filed Jan. 16, 2019, which claims the benefit of U.S. Provisional Application No. 62/777,604, filed on Dec. 10, 2018, the entire contents of each of which is hereby incorporated by reference herein.

TECHNICAL FIELD

This disclosure relates to the field of data aggregation and analysis systems, and in particular to providing an object-based response to a natural language query.

BACKGROUND

Modern data centers often comprise thousands of hosts that operate collectively to service requests from even larger numbers of remote clients. During operation, components of these data centers can produce significant volumes of machine-generated data. The presence of this much data has made it challenging to perform indexing and searching operations in an efficient manner. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

DETAILED DESCRIPTION

Figure 1:
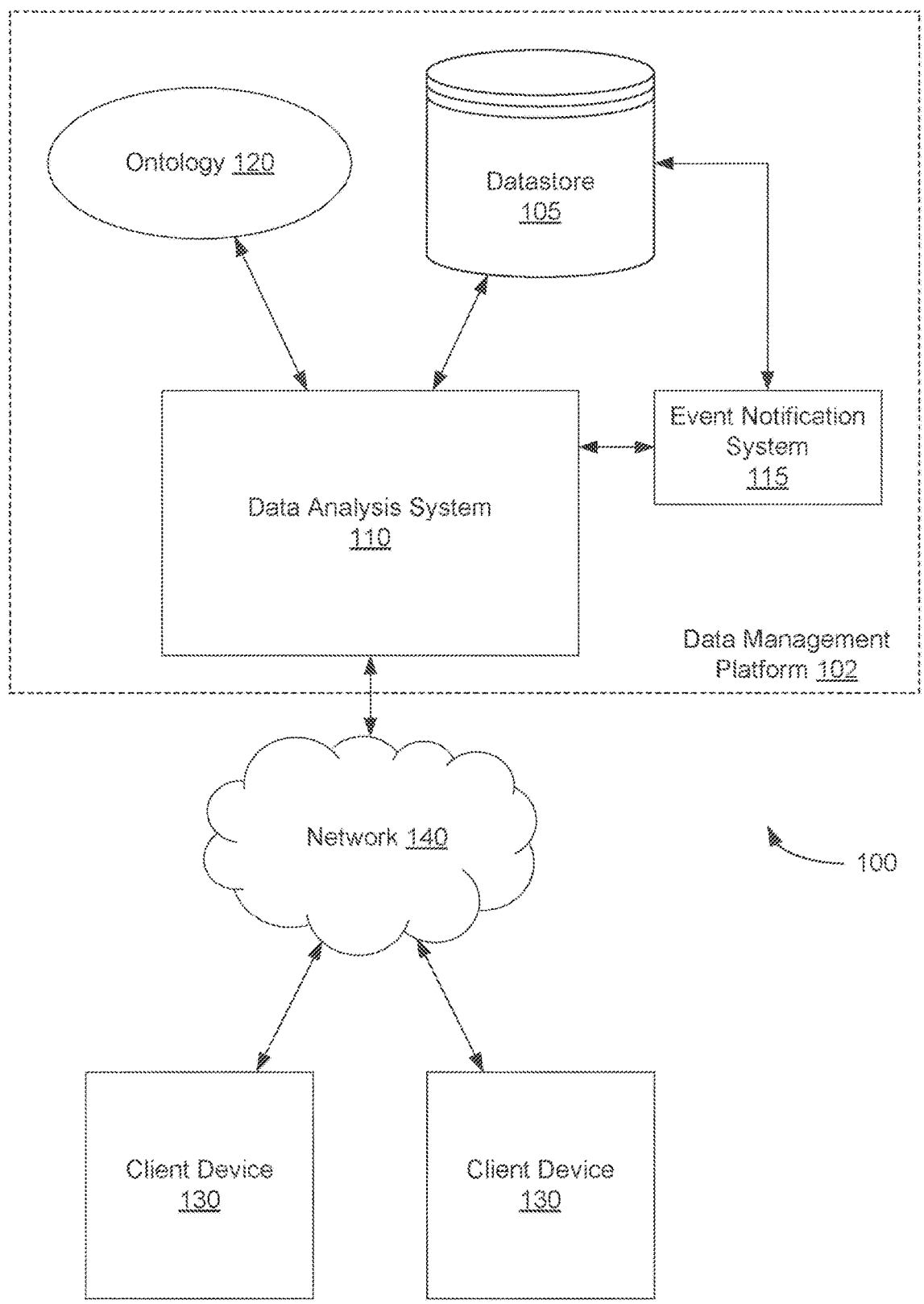
FIG. 1 is a block diagram illustrating a network environment in which a data analysis system may operate, according to an implementation.

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to providing an object-based response to a natural language query. Given the proliferation of data in many organizations, certain enterprise users have access to large amounts of data about their organization, but lack the specific training to perform detailed analyses of that data. Such analyses could be very helpful in informing the business decisions these users make. Presently, without detailed knowledge of and experience with specific query languages and data analysis techniques, many users resort to asking a dedicated data science team to run certain analyses on the enterprise data. For example, a user may send an email with their questions to the data science team and wait to receive an answer after the analysis is performed. This current process can be rather inefficient and can take a long time (e.g., days or weeks) before the desired answers are received by the requesting user. In addition, the data science team within the enterprise is rather reactionary, in that they generally wait until various departments ask them specific questions before finding an appropriate answer. Thus, the data science team may lack the guidance to perform preemptive data analyses on behalf of other members of the organization.

Aspects of the present disclosure address the above and other deficiencies by providing a data analysis system that allows an enterprise user to submit a free form query (e.g., a question) pertaining to the organization's data. For example, this user query may be entered in a user interface using natural human language and may not require the user to have any detailed knowledge of the underlying data sets and the relevant query language, or have experience in data science. The data analysis system may identify a response to the user query, which can be presented to the user in the interface.

In one implementation, to identify the response, the data analysis system parses the free form user query and recognizes one or more objects within the user query. The data analysis system may then perform a keyword comparison to identify any token (e.g., word, term, phrase, etc.) within the query that corresponds to an object in a data object model associated with underlying data (e.g., enterprise data stored in one or more databases). An object is a computing element representing a data portion or a grouping of data portions with a given set of properties (e.g., characteristics), whereby the object can be used to identify the data portion or grouping of data portions from an underlying dataset. A data object model is represented by an ontology which defines objects derived from the underlying data, properties of the objects, and relationships between the objects. The data analysis system may further use one or more objects identified in the query to find appropriate artifact(s) associated with the underlying data that can be used to provide a response to the user query. An artifact may refer to code or logic used to select data from one or more datasets in accordance with certain parameters. For example, certain artifacts may be linked with an object identified in the user query and other artifacts may have been surfaced in response to similar user queries that were previously received. In one implementation, a machine learning model is trained to provide artifacts relevant to a specific user query. When providing relevant artifacts, the machine learning model may consider objects identified in the user query and the context of the user query. The context may include, for example, who is asking the question, when they are asking the question, who created the artifact to be used to provide a response, etc. The machine learning model can use a dynamic scoring mechanism to rank candidate artifacts and can identify one or more of the highest ranking candidates to be surfaced in response to the user query. The machine learning model may be initially trained based on a training set of user queries and responses. Subsequently, user feedback on responses predicted by the machine learning model can be used to continue training the model.

In one implementation, the data analysis system uses the identified artifact(s) to identify or generate a response that can be presented on an answer board in the user interface. The response or responses on the answers board can be viewed by the user and optionally "pinned" to cause the associated artifact to be re-run (e.g., periodically or per request at a later time). In the user interface, the token in the user query that corresponds to an identified object can be highlighted, emphasized, or otherwise visually indicated, and made selectable by the user. Upon receiving a user selection of the token that corresponds to the identified object, the data analysis system can present a view of the underlying dataset or datasets associated with the object so that the user can review the data and optionally refine the user query based on the review. Additional details of providing an object-based response to a natural language query are provided below with respect to FIGS. 1-7.

Accordingly, the technology described herein allows a less sophisticated user to retrieve detailed data analysis results while providing a number of technical advantages. By identifying previously created artifacts that generate responses to queries using the data object model, the data analysis system need not create and store new and/or additional artifacts that provide responses to the same queries. This can result in substantially less utilization of storage resources associated with the data analysis system. In addition, the data object model described herein enables the data analysis system to identify a response to the user query without having to execute additional data analysis operations on potentially significantly large datasets. This can save data processing resources (e.g., CPU cycles) in the data analysis system which can instead be utilized for other tasks.

FIG. 1 is a block diagram illustrating a network environment in which a data analysis system may operate, according to an implementation. The network environment 100 can include one or more client devices 130 and a data management platform 102, which can be in data communication with each other via network 140. Computer system 800 illustrated in FIG. 8 may be one example of any of client devices 130 or server(s) in the data management platform 102. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability.

Data management platform 102 may include, for example, a server computer or any other system providing computing capability. Alternatively, data management platform 102 may employ a plurality of computing devices that may be arranged, for example, in one or more server banks or computer banks or other arrangements. Such computing devices may be positioned in a single location or may be distributed among many different geographical locations. For example, data management platform 102 may include a plurality of computing devices that together may comprise a hosted computing resource, a grid computing resource and/or any other distributed computing arrangement. In some cases, data management platform 102 may correspond to an elastic computing resource where the allotted capacity of processing, network, storage, or other computing-related resources may vary over time.

In some implementations, data management platform 102 can include data analysis system 110, event notification system 115, datastore 105 storing the underlying data (e.g., enterprise data) and an ontology store storing ontology 120 representing a data object model of the underlying data. Depending on the implementation, datastore 105 and the ontology store may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The ontology store may be part of the datastore 105 or be a separate repository including, for example, a database, one or more tables, one or more files, etc.

Datastore 105 may include structured and/or unstructured sets of data that can be divided/extracted for provisioning when needed by one or more components of the data analysis system 100. Datastore 105 may include one or more versioned datasets of information. The dataset(s) may be stored in one or more databases, such as a relational database. A relational database may organize information/data into tables, columns, rows, and/or other organizational groupings. Groupings of information may be linked/referenced via use of keys (e.g., primary and foreign keys).

Data analysis system 110 can receive a user-submitted free form query (e.g., a question) pertaining to data in datastore 105. For example, this user query may be entered in a user interface provided by the data analysis system 110 and presented on one of client devices 130. The user query may be entered using natural human language and may not require the user to have any detailed knowledge of the underlying data sets and the relevant query language, or have experience in data science. The data analysis system 100 may identify any token (e.g., word, term, phrase) in the user query that corresponds to an object.

An object may refer to a thing/a grouping of things with a given set of properties. An object may reference tangible/intangible thing(s) and/or animate/inanimate thing(s). As non-limiting examples, an object may refer to person(s), vehicle(s), portion(s) of a vehicle, building(s), portion(s) of a building, investigation(s), a portion(s) of an investigation, schedule(s), or right(s)/demands for right(s), and/or other things. Other types of objects are contemplated.

A definition of an object may describe the object by specifying/identifying one or more properties (e.g., characteristics) of the object. For example, an object may include a person and a definition of the object may describe the person by specifying/identifying particular properties (e.g., gender, height, weight, education, occupation, address, phone number) of the person. The values of the properties of the object may be stored in a dataset(s) (e.g., of relational databases(s)). For example, the values of the properties may be stored in one or more columns and/or rows of a database as strings, numbers, and/or other forms of expression. The definition of the object may identify the particular column(s) and/or row(s) of the database storing the relevant values of the properties of the object. In some implementations, a given property of an object may be derived from one or more values of dataset(s). For example, a given property of an object may be determined based on multiple values within one or more tables.

In some implementations, an object may be related to one or more other objects. Relationship among objects may be between objects of same type (e.g., relationship between people objects, such as between family members, co-workers, persons who have interacted with each other) and/or between objects of different types (e.g., relationship between a person object and a non-person object, such as between a person and a schedule, a person and an investigation). For example, objects representing individual investigations (e.g., of accidents, of claims, of demands for rights) may be related to an object representing a group of investigations (e.g., based on commonalities, based on user input). Such relationships may effectuate grouping individual investigations into groups of investigations. As another example, objects representing individual investigations (e.g., of accidents, of claims, of demands for rights) may be related to an object representing persons (e.g., persons associated with investigations). Relationships between objects may include one-to-one relationships, one-to-many relationship, many-to-one relationships, many-to-many relationships, and/or other relationships.

In some implementations, a definition of an object may be included within an ontology 120 that is stored in the ontology data store. Ontology 120 may include one or more objects/types of objects representing different things. Ontology 120 may define other aspects of objects, such as how properties of an object may be presented and/or modified. For example, ontology 120 may include a person object type including a name property, and the ontology may define how the name may be presented (e.g., first name followed by last name; last name followed by first name; first initial followed by last name). Ontology 120 may define how/whether the name may be modified (e.g., based on user input, based on user account privileges). As another example, a definition of a person object may include one or more relationship properties and ontology 120 may define how/whether the relationship(s) may be presented and/or modified. In some implementations, ontology 120 may define whether/how properties of an object may be created and/or removed. For example, ontology 120 may define whether a user may add or remove one or more properties of the person object type. The definitions/ontologies may be created based on user input. The definitions/ontologies may be modified (e.g., based on user input, based on system changes) in the ontology data store.

An object defined in the ontology 120 may be associated with information stored in one or more datasets of datastore 105. Associating object(s) with information stored in dataset(s) may include connecting/linking the object(s) with the information stored in the dataset(s). The information to be associated with object(s) may be determined based at least in part on the definition(s) of the object(s). For example, a definition of an object may specify/identify particular columns and/or rows of a dataset including relevant values of properties of the object, and the ontology manager may associate the object with the values in the specified/identified portions of the dataset. Individual portions of the dataset may include individual values (e.g., numbers, strings) for individual properties of the object. In some implementations, an object may be associated with multiple values of a property (e.g., a person object may be associated with multiple phone numbers). In some implementations, an object may be associated with multiple values of a property via links between objects. For example, a phone number object may be associated with multiple values of phone numbers included in a dataset and the phone number object may be linked to a person object to associate the person object with multiple values of the phone numbers. The associations between the information in the underlying data and the objects may be included in the ontology 120 or stored separately (e.g., in the ontology store, datastore 105, or any other data store). In some implementations, one or more associations between information and objects may be secured such that usage (e.g., viewing, modifying) of the objects/particular properties of the object may be restricted based on security/authorization level of the users/systems.

In some implementations the association of an object with information stored in dataset(s) may be changed based on changes to the definition/ontology of the object. For example, a definition/ontology of an object may be changed so that the specified/identified portion of the dataset for a property of the object is changed (e.g., changed to a different column, a different row, and/or a different range). Responsive to the change in the specification/identification of the portion(s) of the dataset, the association of the object may be updated with the changed/new information.

In some implementations, an object may be backed by a single row/column in a dataset with a single primary key column/row. In such a case, the object may be uniquely identified by a dataset resource identifier, a branch, a primary key column/row name, and a primary key value. In some implementations, an object may be backed by a single row/column in a dataset with a multi-column/row primary key. In such a case, one or more transforms may be used to reduce the backing to the single primary key column/row case. In some implementations, an object may be backed by rows/columns from a single dataset or multiple datasets.

As discussed above, data analysis system 110 derives one or more objects from the user query using ontology 120. Based on the derived object(s), data analysis system 110 identifies one or more artifacts that can be used to provide a response to the user query. An artifact may include computing logic (i.e., code) which can be executed to obtain desired data from one or more datasets (e.g., data from certain columns/rows of the dataset(s)). As such, an artifact is associated with one or more datasets from which the desired data should be obtained. In addition, an artifact can be associated with one or more objects that are linked to particular columns/rows from which the data should be obtained when the artifact is executed. Data analysis system 110 may identify artifacts that are relevant to the user query based on a correspondence between the object(s) derived from the user query and the object(s) associated with an artifact. Data analysis system 110 may then select one of identified artifacts, and run the selected artifact to obtain a response to the user query. The response is presented to the user on client device 130.

In some implementations, if data analysis system 110 does not identify artifacts that are relevant to the user query (e.g., there is no correspondence between the object(s) derived from the user query and object(s) associated with any existing artifacts), data analysis system 110 identifies one or more alternative queries based on the content of the original user query, the objects derived from the original user query, and the context of the original user query. For example, data analysis system 110 can compare the original query to previously indexed queries to locate the most similar ones and provide them as alternative queries. In another example, data analysis system 110 can identify, based on ontology 120, objects related to the objects derived from the original user query, find previously indexed queries associated with such related objects, and provide the found queries as alternative queries. The context may include, for example, who is asking the question, when they are asking the question, who created the artifact serving as a response, etc. The alternative queries may include other queries for which an appropriate artifact and/or response is available and which are potentially of interest to the user who presented the original query.

Artifacts can be stored in data store 105, the ontology store, or any other store. As the underlying data is changing, new artifacts can be created and added to the stored artifacts. In some implementations, event notification system 115 can detect the addition of a new dataset to datastore 105 or the modification of an existing dataset in datastore 105, such as to create a new version of the dataset (e.g., a snapshot). Event notification system 115 can notify data analysis system 110 of the addition and/or modification so that data analysis system 110 can process this dataset "event" to create a new artifact or a new mapping for the existing artifact, as will be described in more detail below in conjunction with FIG. 2.

Figure 2:
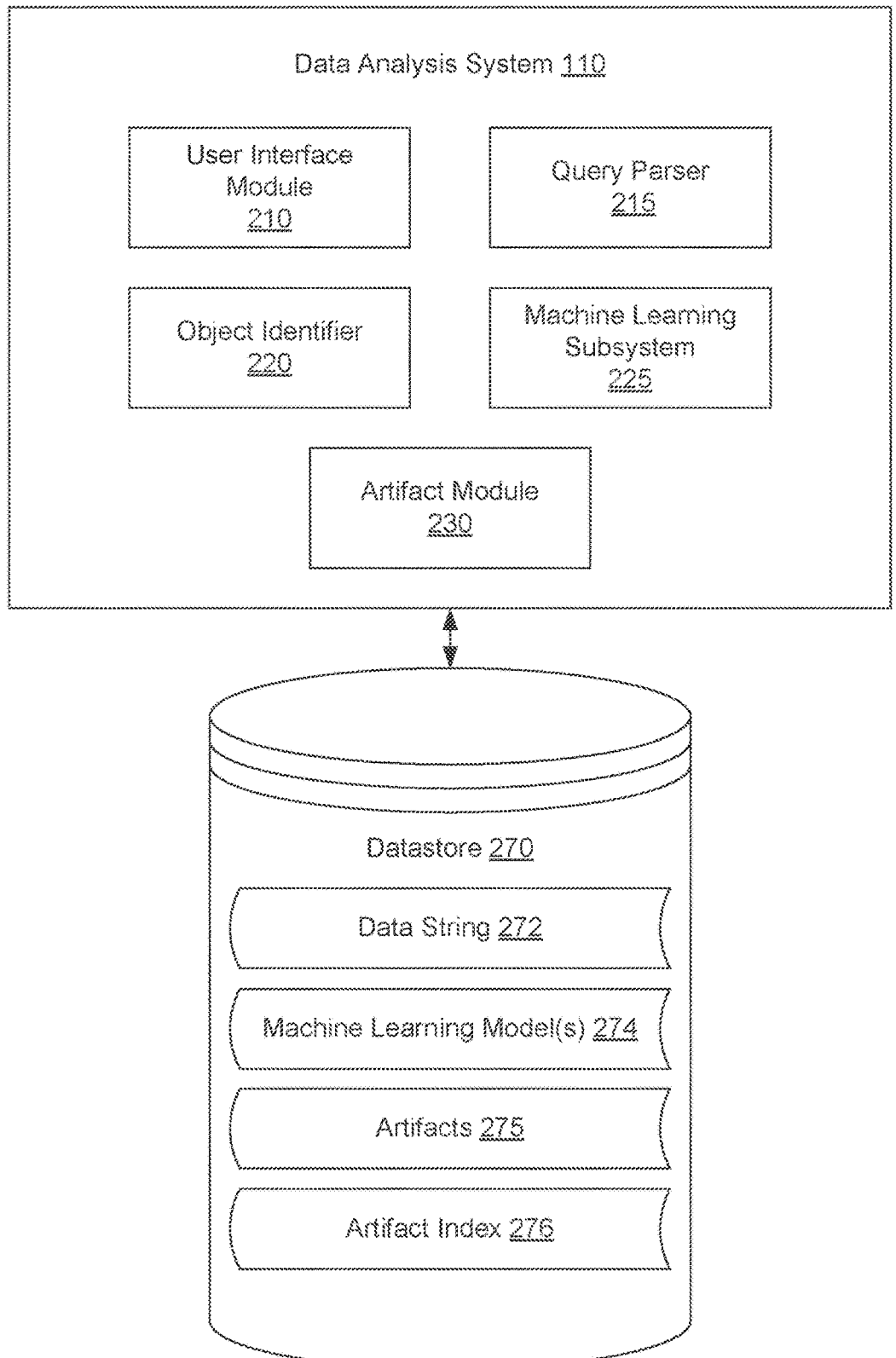
FIG. 2 is a block diagram illustrating a data analysis system, according to an implementation.

FIG. 2 is a block diagram illustrating data analysis system 110, according to an implementation. Data analysis system 110 may include user interface module 210, query parser 215, object identifier 220, machine learning subsystem 225, and artifact module 230. This arrangement of modules and components may be a logical separation, and in other implementations, these modules or other components can be combined together or separated in further components, according to a particular implementation.

In one implementation, datastore 270 is connected to data analysis system 110 and includes a data string 272, machine learning model(s) 274, artifacts 275, and an artifact index 276. Data string 272 can represent the natural language query received by user interface module 210. Data analysis system 110 may store the received query as data string 272 for matching with future user queries and for providing to machine learning subsystem 225 to continue training the machine learning model(s) 274. Machine learning model(s) 274, which may include one model or a set of machine learning models, is trained and used to identify artifacts 275 which can provide appropriate responses for the natural language queries. As discussed above, each artifact 275 is associated with one or more objects defined in the ontology 120. Artifact index 276 includes an index mapping artifacts 275 to associated datasets, or versions of datasets, in datastore 105. In some cases, a new dataset may be periodically created (e.g., monthly to provide a year-to-date revenue report based on different customers of the company). In such cases, the artifact index 276 may be updated to reflect the mapping of the existing artifact to the new dataset (e.g., by changing an existing mapping or creating a new mapping). Accordingly, when an artifact is accessed, artifact index 276 can provide a mapping to the most relevant (i.e., recent) version of the corresponding dataset to ensure that the artifact is executed against the most appropriate version of the dataset.

In one implementation, a single computer system (e.g., data management platform 102) may include both data analysis system 110 and datastore 270. In another implementation, datastore 270 may be external to the computer system and may be connected to data analysis system 110 over a network or other connection. In other implementations, data analysis system 110 may include different and/or additional components which are not shown here to simplify the description. Datastore 270 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Datastore 270 may be part of datastore 105 or be separate from datastore 105.

Figure 6:
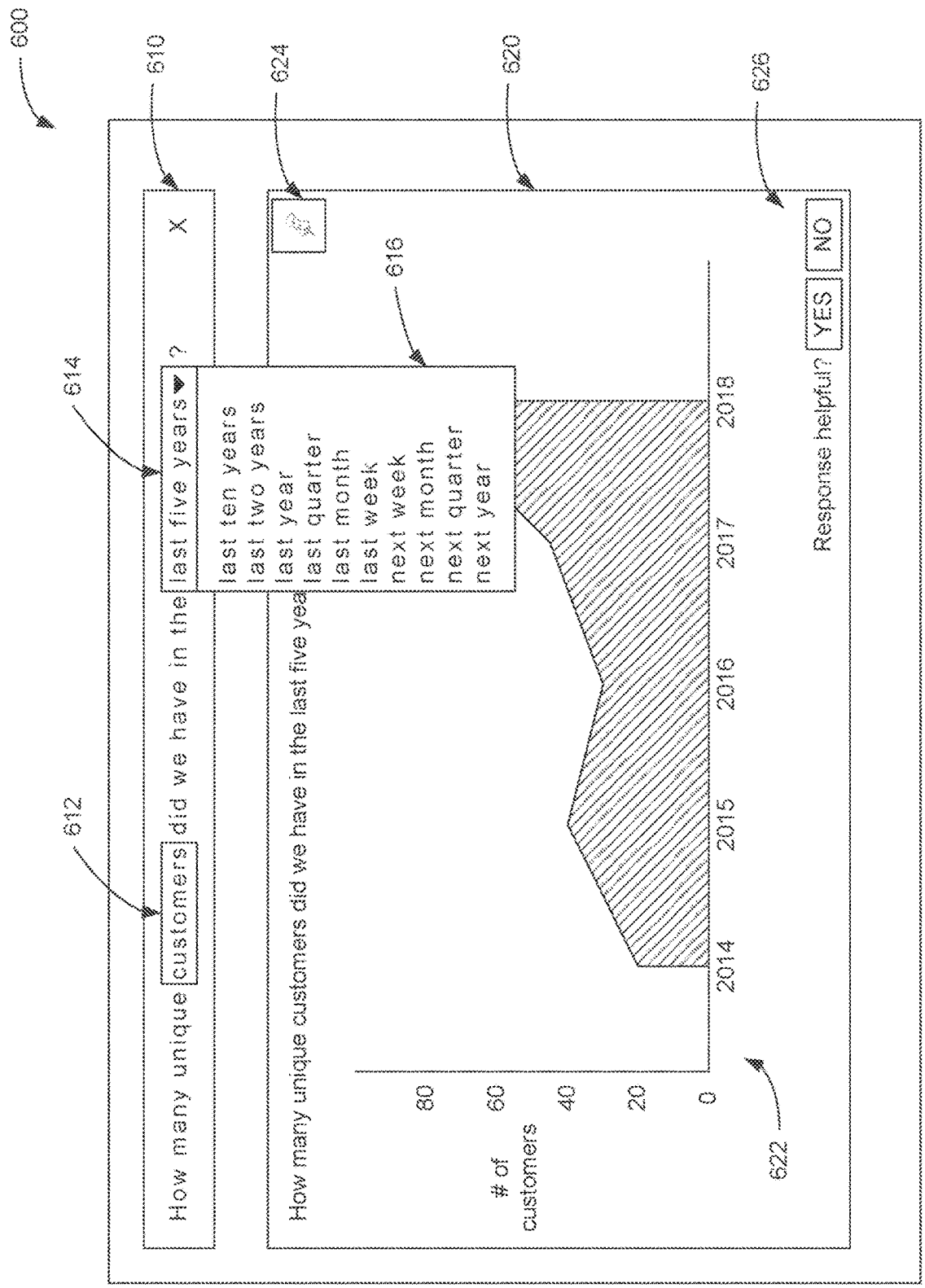
FIG. 6 is a diagram illustrating an example user interface for providing an object-based response to a natural language query, according to an implementation.

In one implementation, user interface module 210 generates a user interface, such as user interface 600 shown in FIG. 6, and processes user interaction with data analysis system 110. For example, user interface module 210 may present user interface 600 to allow a user to provide a natural language query pertaining to a dataset, wherein the dataset is associated with a data object model comprising a plurality of objects, as defined in ontology 120. User interface module 210 may receive, via the user interface 600, user input specifying the natural language query (e.g., a data string comprising the natural language query). In one implementation, the received data string is saved to datastore 270 as data string 272. User interface module 210 may modify, in the user interface 600, the user input to visually indicate one or more portions of the natural language query that each represent an object, as determined by object identifier 220. For example, user interface module 210 may highlight, underline, enlarge, or otherwise emphasize, in the user interface 600, the query portion(s) corresponding to an identified object(s). The user interface module 210 may further present a selectable interface element to visually indicate each of the query portions that represents an object. In response to receiving a selection of the selectable interface element, user interface module 210 may display the data from the dataset corresponding to the object associated with the selectable interface element. As described above, portions of a dataset or datasets in datastore 105 can be associated with an object. When user interface module 210 receives a selection of an element corresponding to that objects, the corresponding portions of the dataset can be retrieved from datastore 105 and presented in the user interface. The user can review the presented data and decide whether to proceed with the specified query or revise the query to obtain a different result. As a result, computing resources are not spent on obtaining a query response that may not be of interest to the user.

In addition, user interface module 210 may present, in the user interface 600, a response to the natural language query based on data from the dataset. The response may include, for example, a visualization (e.g., a graph, chart, table, diagram, etc.) of a data portion of the dataset corresponding to the one or more objects identified in the natural language query. In other implementations, the data from the dataset is presented in some other form (e.g., a textual representation). The user interface module 210 can receive user feedback evaluating the presented response, and can optionally receive a first command causing the response to the query to be recreated (e.g., "pinned") (periodically or per request in the future) until a second command is received to "unpin" the query. While the query is pinned, any time the user accesses the user interface 600, the artifact used to provide the initial response to the query can be re-executed against the most recent version of the dataset (as mapped in artifact index 276) to generate a new response to the query. If no responses to the query are available, user interface module 210 may present one or more alternative queries and present a response based on a selection of one of the alternative queries.

In one implementation, query parser 215 parses the data string 272 received by user interface module 210 to identify a plurality of individual words or phrases (e.g., tokens) within the data string 272. This tokenization may include, for example, extracting keywords from the data string 272. Query parser 215 may identify delimiters in the text, such as punctuation marks and white space, and use the text between these delimiters as tokens.

In one implementation, object identifier 220 identifies, based on the tokens identified by query parser 215, one or more objects that can be derived from the data string 272. For example, object identifier 220 can compare each of the tokens in data string 272 to the objects defined in ontology 120 to determine whether one or more of the tokens correspond to (i.e., match) an object in the ontology 120. Object identifier 220 may further determine whether any of the tokens in the data string 272 represent a property of an object. For example, if the word "customer" is present in the data string "How many customers under age 30 with high spend did we have in the last two years?," "customer" may correspond to an object. The subsequent token "under age 30" from the data string 272 may represent a property (i.e., age characteristic) of the "customer" object. The property can function as a filter to identify relevant data from the datasets of datastore 105 pertaining to customers "under age 30." In addition to identifying an object, and corresponding object properties, object identifier 220 may also determine one or more related objects from ontology 120, if applicable. For example, "spend" may be a property related both to the "customer" object and the "transaction" object, and in order to calculate the spend of a particular customer, dataset data associated with the "customer" object should be used to identify a particular customer younger than 30, and dataset data associated with the "transaction" object should be used to calculate a total amount resulting from transactions initiated by the particular customer.

In one implementation, machine learning subsystem 225 utilizes machine learning model(s) 274 to determine one or more artifacts that can be executed against a dataset from data store 105 to provide a response to the natural language query. For example, machine learning subsystem 225 may provide the data string 272 and the objects derived from the data string 272 as input to the machine learning model(s) 274, and obtain information identifying one or more relevant artifacts as the output of the machine learning model(s) 274. Additional details of machine learning subsystem 225 are provided below with respect to FIG. 3.

In one implementation, artifact module 230 receives a notification of a new or modified dataset in datastore 105 from event notification system 115. Artifact module 230 identifies one or more objects and corresponding object properties associated with the new or modified dataset and populates artifact index 276 with a mapping to the new or modified dataset based on the identified objects. In one implementation, artifact module 230 identifies existing artifacts 275 that are associated with a prior version of the dataset. Artifact module 230 can further identify existing artifacts 275 that would be applicable to the new dataset based on an overlap in the objects associated with the artifact 275 and those identified for the new dataset.

In one implementation, artifact module 230 can generate new artifacts to be mapped to the dataset. For example, upon receiving a notification of a new or modified dataset from event notification system 115, artifact module 230 can determine whether the new or modified dataset can represent an answer to a question, and if so, what kind of question (e.g., a new dataset generated as a quarterly report of the company's top customers can answer a question "What were the company's top customers in the last quarter of 2018?"). Artifact module 230 can make this determination by, for example, examining the report header and text in the new or modified dataset. Artifact module 230 may also use the dataset metadata to identify one or more objects associated with the dataset. Artifact module 230 may then associate the artifact, which was executed to produce the new or modified dataset, with the identified object(s), add this new artifact to the existing artifacts 275, and also add, to the artifact index 276, the mapping between the new artifact and the new or modified dataset.

Figure 3:
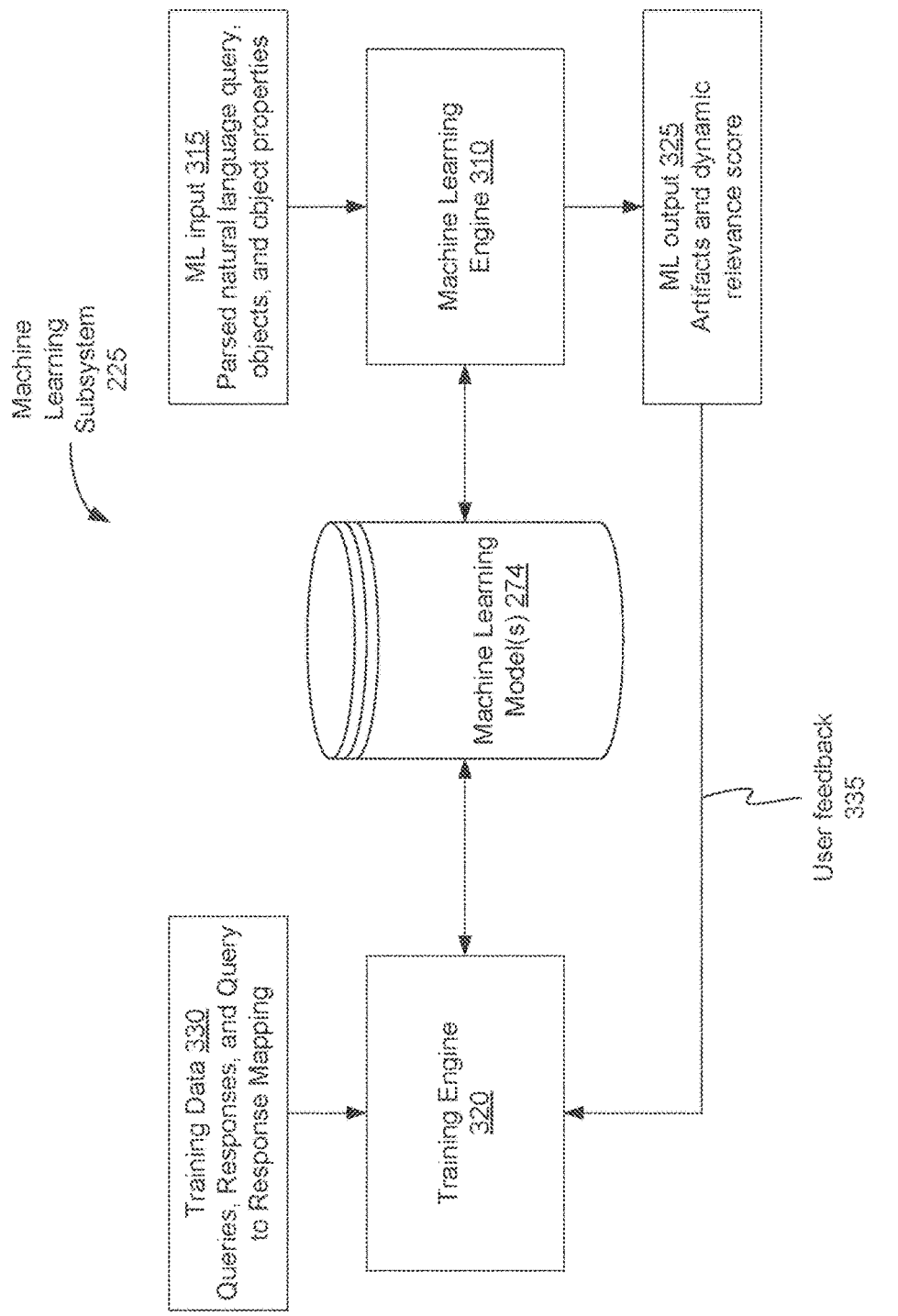
FIG. 3 is a block diagram illustrating a machine learning sub-system, according to an implementation.

FIG. 3 is a block diagram illustrating a machine learning sub-system 225, according to an implementation. Machine learning sub-system 225 includes machine learning engine 310, machine learning model(s) 274 and training engine 320. In one implementation, machine learning engine 310 uses one or more trained machine learning models 274, such as a single model or a set of models, that are trained and used to predict or identify artifacts that can provide an appropriate answer to a natural language question provided as an input 315. In some instances, the machine learning model(s) 274 may be part of the machine learning engine 310 or may be accessed on another machine by the machine learning engine 310. Based on the machine learning model(s) 274, the machine learning engine 310 may obtain an output 325 including one or more artifacts capable of providing a response to the natural language query, as well as an assessment of a quality of the responses (e.g., a dynamic relevance score). The data analysis system 110 may select the artifact with the highest dynamic relevance score and execute it to provide a response to the natural language query.

In one implementation, machine learning model(s) 274 may refer to a model or set of models that is created by training engine 320 using training data 330 that includes training inputs (i.e., objects and/or natural language queries) and corresponding target outputs (i.e., appropriate artifacts and/or responses for respective training inputs). During training, patterns in the training data that map the training input to the target output can be found, and are subsequently used by the machine learning model(s) 274 for future predictions. In some implementations, the context of the query can be also provided as part of the training input. The context may include, for example, who asked the question, when they were asking the question, who created the artifact to be used to provide a response, etc.

The machine learning model(s) 274 may be composed of a single level of linear or non-linear operations (e.g., a support vector machine ("SVM")) or may be a deep network (i.e., a machine learning model that is composed of multiple levels of non-linear operations). Examples of deep networks are neural networks including convolutional neural networks, recurrent neural networks with one or more hidden layers, and fully connected neural networks. Convolutional neural networks include architectures that may provide efficient artifact identification. Convolutional neural networks may include several convolutional layers and sub-sampling layers that apply filters to portions of the dataset to detect certain features.

As noted above, the machine learning model(s) 274 may be trained to determine the artifact or artifacts that can provide the most appropriate response to a given natural language query using training data 330. Once the machine learning model(s) 274 is trained, the machine learning model(s) 274 can be provided to machine learning engine 310 for analysis of new natural language queries and/or the objects identified from those queries received as inputs 315. For example, machine learning engine 310 may input the natural language query, as well as the objects and the object properties derived from the natural language query into the machine learning model(s) 274. The machine learning engine 310 may obtain one or more outputs from the machine learning model(s) 274. The output may include one or more artifacts and optionally a dynamic relevance score for each of the one or more artifacts. In some implementations, the context of the user query can be also provided as input for the machine learning model(s) 274. The context may include, for example, who is asking the question, when they are asking the question, who created the artifact to be used to provide a response, etc. When used in production, user feedback 335 on responses predicted by the machine learning model(s) 274 can be used by training engine 320 to continue training and refining the machine learning model(s) 274.

Figure 4:
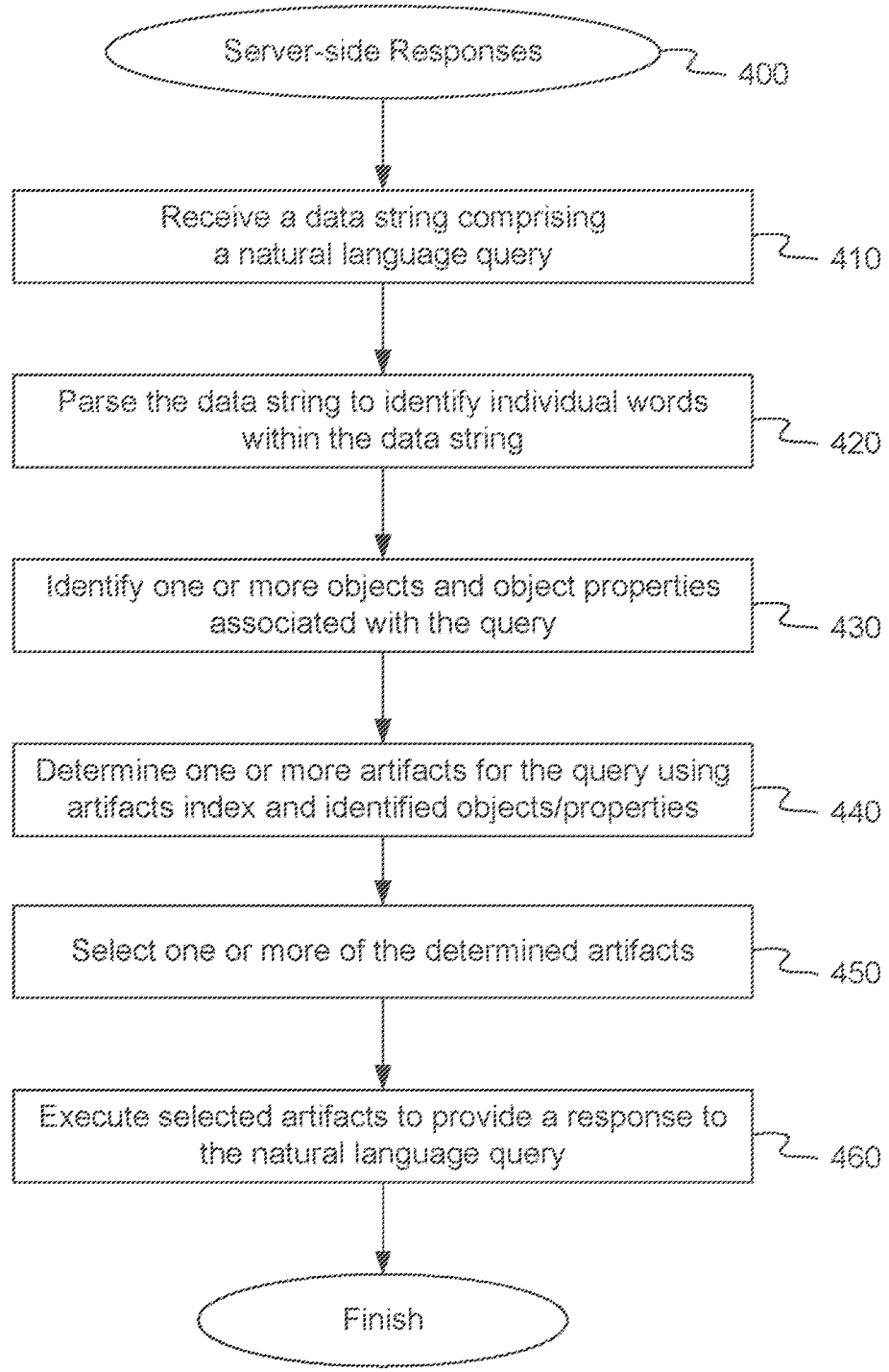
FIG. 4 is a flow diagram illustrating a server-side method for providing an object-based response to a natural language query, according to an implementation.

FIG. 4 is a flow diagram illustrating a server-side method for providing an object-based response to a natural language query, according to an implementation of the present invention. The method 400 may be performed by processing logic that comprises hardware (e.g., circuitry, dedicated logic, programmable logic, microcode, etc.), software (e.g., instructions run on a processor to perform hardware simulation), or a combination thereof. In one implementation, method 400 may be performed by data analysis system 110, as shown in FIGS. 1 and 2.

Referring to FIG. 4, at block 410, method 400 receives a data string comprising a natural language query pertaining to a dataset, wherein the dataset is associated with a data object model comprising a plurality of objects, as defined in ontology 120. In one implementation, user interface module 210 receives the data string in a user input field presented in user interface 600 of FIG. 6. The data string may be presented as free form text, without having any specific structure, and using natural human language, without being written in a particular query language. The natural language query may be any question, request, demand, inquiry, or query pertaining to one or more datasets in datastore 105.

In one implementation, the data object model includes a mapping of the plurality of objects to associated datasets or portions of datasets. The objects include computing elements representing data portions of the dataset, the data portion having an associated set of characteristics specified by the computing element. An object functions as a tag identifying datasets, or portions of datasets, that are related by having an associated set of characteristics. For example, the related data may all pertain to or be associated with a real-word entity, object, person, concept, etc. The object model used herein allows for identification of this related data which may not otherwise be apparent or obtainable via other means, such as keyword identification, etc. In one implementation, ontology 120 includes a mapping table, structure, database, etc. indicating which data portions of a dataset in datastore 105 are associated with each object in ontology 120. In another implementation, metadata associated with each dataset includes an indication of the objects associated with the data contained therein.

At block 420, method 400 parses the data string to identify a plurality of individual words within the data string. In one implementation, query parser 215 performs a tokenization process to extract keywords from the data string. Query parser 215 may identify delimiters in the text, such as punctuation marks and white space, and use the text between these delimiters as tokens. Thus, the text in the data string between the one or more delimiters comprises the plurality of individual words.

At block 430, method 400 identifies, based on the plurality of individual words, one or more objects of the plurality of objects and corresponding object properties that are associated with the natural language query in the data string. In one implementation, object identifier 220 compares each of the individual words to objects in ontology 120 to determine whether one or more of the individual words correspond to (i.e., match) an entry in ontology 120. Depending on the implementation, there may be multiple objects identified within one natural language query and those objects may include general or specific objects. In one implementation, object identifier 220 performs a keyword comparison to determine whether any of the individual words match any of the objects in ontology 120. In another implementation, object identifier 220 applies the individual words as input to a trained machine learning model 274 and obtains an output of the trained machine learning model 274, wherein the output comprises an indication of the one or more objects associated with the natural language query.

At block 440, method 400 determines one or more artifacts that are based on the dataset, wherein each of the one or more artifacts is associated with one of the one or more objects. In one implementation, to determine the one or more artifacts, machine learning engine 310 provides the one or more objects and object properties as an input to a trained machine learning model(s) 274 and obtains an output of the trained machine learning model(s) 274. The output 325 of the trained machine learning model(s) 274 may include an indication of the one or more artifacts that can provide an appropriate response to the natural language query. The one or more artifacts may include one or more pieces of logic (i.e., code) that can be executed against a dataset to identify a data portion of the dataset corresponding to the one of the one or more objects. The resulting data portion can be presented as the response to the natural language query.

In one implementation, the output of machine learning model(s) 274 may further include a dynamic relevance score for each of the one or more artifacts indicating a confidence value or a likelihood that the associated artifact will provide an appropriate answer to the provided natural language query. In one implementation, the dynamic relevance score is based on a context of the natural language query. The context may include, for example, who is asking the question, when they are asking the question, who created the artifact serving as a response, etc. For example, when a particular user asking the question shares similar qualities or characteristics (e.g., title, position, experience level, etc.) with other users who have previously asked the same or similar questions, responses deemed favorable by those other users may be assigned a higher dynamic relevance score with respect to the users asking the present question. Similarly, artifacts created by users having certain qualities or characteristics may generally considered to be more useful, and thus may be assigned a higher dynamic relevance score compared to other artifacts created by other users.

At block 450, method 400 selects one or more of the determined artifacts, and at block 460, method 400 executes the selected artifacts to provide a response to the natural language query. In one implementation, to determine the one or more artifacts to be used to provide a response to the natural language query, machine learning engine 310 may determine the one or more artifacts having a highest dynamic relevance score. In one implementation, machine learning engine 310 determines whether any artifacts have an associated dynamic relevance score that satisfies a defined threshold criterion (e.g., has a dynamic relevance score that meets or exceeds a threshold value). In one implementation, machine learning engine 310 surfaces the one or more artifacts having the highest dynamic relevance score as the response to the natural language query. In another implementation, machine learning engine 310 surfaces any of the artifacts having a dynamic relevance score that satisfies the defined threshold criterion, which may include multiple separate responses.

Figure 5:
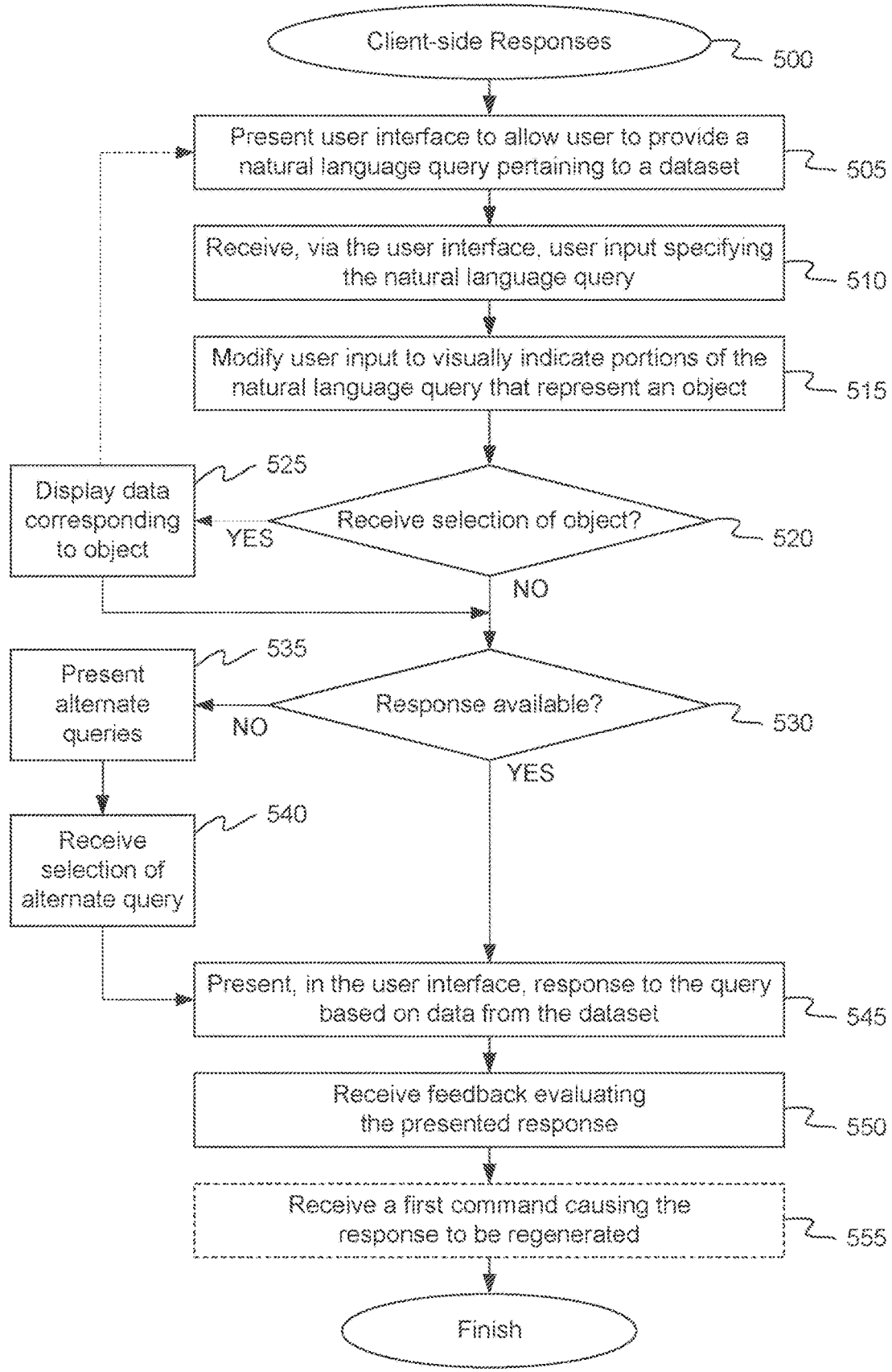
FIG. 5 is a flow diagram illustrating a client-side method for providing an object-based response to a natural language query, according to an implementation.

FIG. 5 is a flow diagram illustrating a client-side method for providing an object-based response to a natural language query, according to an implementation. The method 500 may be performed by processing logic that comprises hardware (e.g., circuitry, dedicated logic, programmable logic, microcode, etc.), software (e.g., instructions run on a processor to perform hardware simulation), or a combination thereof. In one implementation, method 500 may be performed by data analysis system 110, as shown in FIGS. 1 and 2.

Referring to FIG. 5, at block 505, method 500 presents a user interface 600, as shown in FIG. 6, to allow a user to provide a natural language query pertaining to a dataset, wherein the dataset is associated with a data object model comprising a plurality of objects, such as those defined in ontology 120. In one implementation, user interface module 210 of data analysis system 110 generates user interface 600 and present user interface 600 on a display device of client computing system 130. At block 510, method 500 receives, via the user interface 600, user input specifying the natural language query. In one implementation, user interface module 210 receives a data string comprising the natural language query. The user can provide the natural language query (e.g., free form text) using natural human language without having any specific structure, being in a particular query language, etc. For example, a user can enter a natural language query into a user input field 610 of user interface 600. The natural language query may be any question, request, demand, inquiry, or query pertaining to one or more datasets. In one implementation, user interface module 210 saves the received data string to datastore 270 as data string 272.

At block 515, method 500 modifies, in the user interface 600, the user input to visually indicate one or more portions of the natural language query that each represent an object from ontology 120, as determined by object identifier 220. For example, user interface module 210 may highlight, underline, enlarge, or otherwise emphasize the portions corresponding to any identified object in the user interface. In one implementation, user interface module 210 presents a selectable interface element to visually indicate each of the portions representing an object. At block 520, method 500 determines whether a selection of the selectable interface element has been received. In response to receiving, a selection of the selectable interface element, at block 525, method 500 displays the data from the dataset corresponding to the object associated with the selectable interface element. Since the object functions as a tag identifying datasets, or even portions of individual datasets, that have an associated set of characteristics (e.g., are pertaining to or associated with a real-word entity, object, person, concept, etc.), it may be beneficial to the user to view the relevant data associated with the object. Accordingly, user interface module 210 may display the data for user review in user interface 600, or in a separate window, tab, interface, etc. Having reviewed the data, the user may refine their query and method 500 optionally returns to block 505.

At block 530, method 500 determines whether a response to the natural language query is available. As described above with respect to method 400 of FIG. 4, data analysis system 110 may parse the natural language query, identify one or more objects from the query, and determine whether one or more artifacts are available to provide a response using a trained machine learning model. If there is an artifact having a dynamic relevance score that satisfies a defined threshold criterion, data analysis system 110 may determine that a response to the natural language query is available. If there are no identified artifacts having a dynamic relevance score that satisfies the defined threshold criterion, data analysis system 110 may determine that a response to the natural language query is not available.

If no response is available, at block 535, method 500 presents one or more alternative queries, and at block 540, method 500 receives a selection of one of the alternative queries. As discussed above, data analysis system 110 can identify the one or more alternative queries based on the content of the presented natural language query, the objects identified from the presented natural language query, as well as the context of the natural language query. The alternative queries may include other queries for which an appropriate artifact and/or response is available and which are potentially of interest to the user who presented the original natural language query. User interface module 210 can optionally receive a selection of one of the presented alternative queries for which a response can be presented in place of the original natural language query.

If a response is available at block 530 (or based on the selection at block 540), at block 545, method 500 presents, in the user interface 600, a response to the natural language query based on data from the dataset. The response may include, for example, a visualization (e.g., a graph, chart, table, graphic, diagram, etc.) of a data portion of the dataset corresponding to the one or more objects in the natural language query. The identified object may have an associated artifact (e.g., a piece of code/logic) that provides the visualization when executed on the data from the dataset. In other implementations, the response may include some other presentation besides a visualization, such as, a text presentation of the data.

At block 550, method 500 receives user feedback evaluating the presented response. For example, the user interface 600 may include a mechanism by which the user can provide feedback evaluating the presented response. Via this mechanism, the user may indicate whether or not the presented response is appropriate (e.g., helpful) for the natural language query. The user feedback may further indicate how appropriate the response was across a given range of scores indicating helpfulness (e.g., 0-10). This feedback can be used to further refine the machine learning model used to identify responses to additional queries in the future. The user interface module 210 can receive user feedback evaluating the presented response (block 550), and can optionally receive a first command (block 555) causing the artifact used to generate the response to be re-executed (e.g., "pinned") until a second command is received causing the artifact to be "un-pinned." While an artifact is pinned, any time the user accesses the user interface 600, the logic that makes up the artifact can be re-executed against the most recent version of the dataset (as mapped in artifact index 276) to regenerate a response to the query. If no responses to the query are available, user interface module 210 may present one or more alternative queries and present a response based on a selection of one of the alternative queries.

FIG. 6 is a diagram illustrating an example user interface 600 for providing an object-based response to a natural language query, according to an implementation. The user interface 600 may be generated by user interface module 210 of data analysis system 110 and presented on a display device of client computing system 130. In one implementation, the user interface 600 includes a user input field 610 and a response field 620. A user can enter a natural language query into user input field 610. In the illustrated implementation, the natural language query includes a text string taking the form of a question "How many unique customers did we have in the last five years?" In other implementations, the natural language query may be any question, request, demand, inquiry, or query pertaining to one or more datasets in datastore 105. The user can provide a natural language query (e.g., free form text) using natural human language without having any specific structure, being in a particular query language, etc.

In one implementation, user interface module 210 may modify, in the user interface 600, the user input to visually indicate one or more portions 612 of the natural language query that each represent an object. For example, user interface module 210 may highlight, underline, enlarge, or otherwise emphasize the portion or portions 612 corresponding to any identified object in user input field 610. The user interface module 210 may present a selectable interface element to visually indicate each of the portions 612 representing an object. In the illustrated implementation, the portion 612 including the text "customers" was recognized as an object and presented as a selectable interface element. The selectable interface element may include a button, link, menu, widget, or other element. In response to receiving a selection of the selectable interface element, user interface module 210 may display the data from the dataset corresponding to the object associated with the selectable interface element. In one implementation, the data is displayed in user interface 600. In another implementation, the data is displayed in a separate window, tab, interface, etc.

In one implementation, user interface module 210 may further modify the user input to visually indicate one or more portions 614 of the natural language query that each represent a first class concept. A first class concept may include an object parameter used to identify an appropriate artifact to provide a response to the natural language query. The parameter may include a limitation or a filter constraint that can narrow the results to provide a more appropriate result. As illustrated in FIG. 6, portion 614 recites a period of time "last five years." As a result, artifact module 225 can search for artifacts related to the object "customers" but limited to the "last five years." In one implementation, portion 614 is selectable to present a pull-down menu 616 including other optional first class concepts. The user may, for example, select some other time period such as "last ten years," "last year," "last month," etc., to modify the natural language query, and potentially obtain different results.

Response field 620 may include one or more responses, such as response 622, to the natural language query based on data from the dataset. The response 522 may include, for example, a visualization (e.g., a graph, chart, table, diagram, etc.) of a data portion of the dataset corresponding to the one or more objects identified in the natural language query. In the example illustrated in FIG. 6, the visualization includes a line chart showing the number of unique customers in each of the last five years (as specified by the natural language query). In one implementation, the response 622 is removed from response field 620 when the user enters a new query in user input field 610 or when the user exits interface 600. In another implementation, however, response field 620 includes a command button 624 that, when selected, causes the artifact that generated response 622 to be maintained in the response field 620 (e.g., "pinned"). In this implementation, the artifact may be maintained in the response field 620 until a second command is received causing the artifact to be removed from the response field 620. In addition, response field 620 may include a user feedback interface 626 by which the user can provide feedback evaluating the presented response. For example, the user may indicate whether or not the response 622 is appropriate (e.g., helpful) for the entered natural language query in user input field 610. This feedback can be used to further refine the machine learning model used to identify responses to additional queries in the future.

Figure 7:
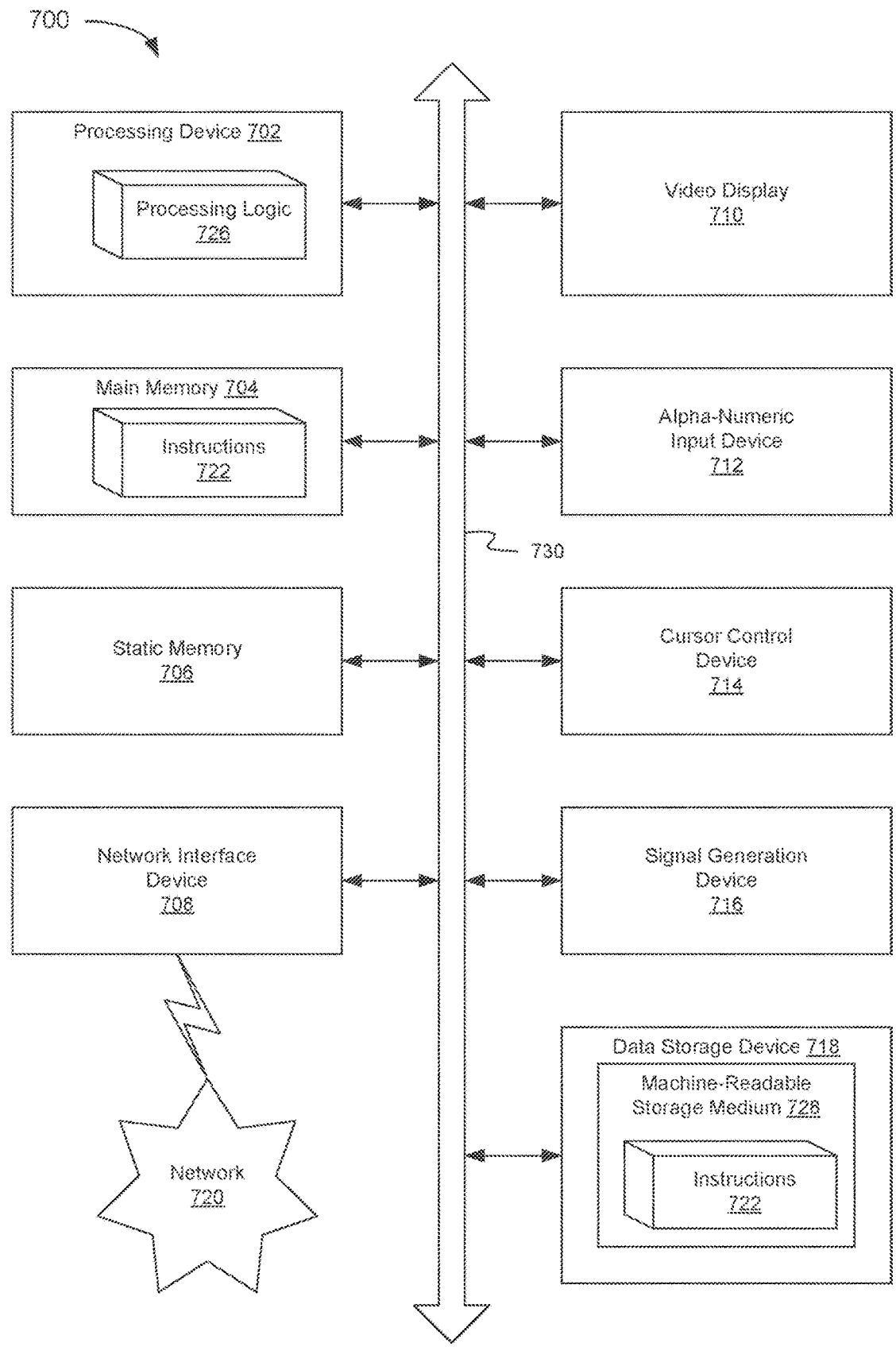
FIG. 7 is a block diagram illustrating a computer system, according to an implementation.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a computing device, such as a server of data management platform 102 running data analysis system 110 or a client computing system 130.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions for providing an object-based response to a natural language query, as described herein. While the machine-readable storage medium 728 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving a data string comprising a natural language query pertaining to a dataset, the dataset being associated with a data object model comprising a plurality of objects;
   parsing the data string to identify a plurality of individual words within the data string;
   applying the plurality of individual words as an input to a trained machine learning model to obtain an output, the output including an indication of one or more objects of the plurality of objects;
   generating a response to the natural language query based at least in part on the one or more objects; and
   determining one or more artifacts using the trained machine learning model based on the dataset, wherein each artifact of the one or more artifacts is associated with at least one of the one or more objects;
   wherein the method is performed using one or more processors.

2. The method of claim 1, further comprising:
   determining whether one or more individual words of the plurality of individual words correspond to a definition of the one or more objects included within an ontology associated with the data object model.

3. The method of claim 1, wherein the output includes an indication of the one or more artifacts.

4. The method of claim 3, wherein the output further includes a dynamic relevance score for each artifact of the one or more artifacts.

5. The method of claim 4, wherein the dataset includes a plurality of datasets, wherein the method further comprises:
   selecting an artifact from the one or more artifacts having a highest dynamic relevance score;
   identifying a corresponding dataset in the plurality of datasets from an artifact index; and
   executing the selected artifact against the corresponding dataset to generate the response to the natural language query.

6. The method of claim 1, further comprising:
   identifying previously stored natural language queries that are similar to the natural language query in the data string; and
   providing at least one of the previously stored natural language queries as an alternative query.

7. The method of claim 1, wherein the trained machine learning model is trained using a plurality of historical natural language queries and historical responses.

8. The method of claim 1, further comprising:
   presenting a user interface to allow a user to provide the natural language query;
   receiving a user input indicating a first command corresponding to the response, the first command causing the response to the natural language query to be recreated until a second command is received.

9. The method of claim 8, further comprising:
   modifying, in the user interface, a visual indication of one portion of the natural language query to a selectable interface element including a plurality of selectable options associated with the one portion of the natural language query, wherein the selectable interface element is part of a visual indication of the natural language query.

10. A system comprising:
    one or more memories; and
    one or more processors coupled to the one or more memories and configured to perform operations comprising:
    receiving a data string comprising a natural language query pertaining to a dataset, the dataset being associated with a data object model comprising a plurality of objects;
    parsing the data string to identify a plurality of individual words within the data string;
    applying the plurality of individual words as an input to a trained machine learning model to obtain an output, the output including an indication of one or more objects of the plurality of objects;
    generating a response to the natural language query based at least in part on the one or more objects; and
    determining one or more artifacts using the trained machine learning model based on the dataset, wherein each artifact of the one or more artifacts is associated with at least one of the one or more objects.

11. The system of claim 10, wherein the operations further comprise:
    determining whether one or more individual words of the plurality of individual words correspond to a definition of the one or more objects included within an ontology associated with the data object model.

12. The system of claim 10, wherein the output includes an indication of the one or more artifacts.

13. The system of claim 12, wherein the output further includes a dynamic relevance score for each artifact of the one or more artifacts;
    wherein the dataset includes a plurality of datasets;
    wherein the operations further comprise:
    selecting an artifact from the one or more artifacts having a highest dynamic relevance score;
    identifying a corresponding dataset in the plurality of datasets from an artifact index; and executing the selected artifact against the corresponding dataset to generate the response to the natural language query.

14. The system of claim 10, wherein the operations further comprise:
    identifying previously stored natural language queries that are similar to the natural language query in the data string; and
    providing at least one of the previously stored natural language queries as an alternative query.

15. The system of claim 10, wherein the trained machine learning model is trained using a plurality of historical natural language queries and historical responses.

16. The system of claim 10, wherein the operations further comprise:
    presenting a user interface to allow a user to provide the natural language query;
    receiving a user input indicating a first command corresponding to the response, the first command causing the response to the natural language query to be recreated until a second command is received.

17. The system of claim 16, wherein the operations further comprise:
    modifying, in the user interface, a visual indication of one portion of the natural language query to a selectable interface element including a plurality of selectable options associated with the one portion of the natural language query, wherein the selectable interface element is part of a visual indication of the natural language query.

18. A non-transitory computer-readable storage medium storing instructions that, when executed by a processing device, cause the processing device to perform operations comprising:
    receiving a data string comprising a natural language query pertaining to a dataset, the dataset being associated with a data object model comprising a plurality of objects;
    parsing the data string to identify a plurality of individual words within the data string;
    applying the plurality of individual words as an input to a trained machine learning model to obtain an output, the output including an indication of one or more objects of the plurality of objects;
    generating a response to the natural language query based at least in part on the one or more objects; and
    determining one or more artifacts using the trained machine learning model based on the dataset, wherein each artifact of the one or more artifacts is associated with at least one of the one or more objects.

* * * * *